United States Patent [19]
Toyama et al.

[11] 3,976,363
[45] Aug. 24, 1976

[54] OPTICAL SYSTEM FOR COLOR TELEVISION CAMERA

[75] Inventors: Seiji Toyama, Kawaguchi; Kazuo Yoshikawa, Omiya, both of Japan

[73] Assignee: Fuji Photo Optical Co., Ltd., Omiya, Japan

[22] Filed: July 1, 1974

[21] Appl. No.: 484,973

[30] Foreign Application Priority Data
July 2, 1973 Japan............... 48-73649

[52] U.S. Cl................. 350/173; 350/184; 358/55
[51] Int. Cl.² ............ G02B 27/10; H04N 9/04
[58] Field of Search............ 350/173, 184, 202; 358/50, 52, 55

[56] References Cited
UNITED STATES PATENTS

| | | | |
|---|---|---|---|
| 2,963,937 | 12/1960 | Raitiere | 350/173 |
| 2,971,051 | 2/1961 | Back | 350/173 X |
| 3,062,916 | 11/1962 | Kingsbury et al. | 350/173 X |
| 3,333,053 | 7/1967 | Back | 350/173 X |
| 3,481,664 | 12/1969 | Takano | 350/186 X |
| 3,521,944 | 7/1970 | Kishikawa | 350/173 |
| 3,527,523 | 9/1970 | Travis | 350/173 X |
| 3,547,521 | 12/1970 | Ichizuka et al. | 350/173 X |
| 3,615,125 | 10/1971 | Higuchi et al. | 350/184 |
| 3,784,284 | 1/1974 | Nakamura | 350/186 |

*Primary Examiner*—David H. Rubin

[57] ABSTRACT

A zoom lens system of a color television camera is divided into a front lens component comprising a zooming lens system and a front part of a relay lens system, and three equivalent rear lens components each comprising a rear part of the relay lens system. A color separating prism system is located between the front and the rear parts of the relay lens system. The rear lens components are convergent so that the angle of light beams incident into the prism system may be smaller than that of the light beam incident into the image pick-up tubes.

3 Claims, 4 Drawing Figures

OPTICAL SYSTEM FOR COLOR TELEVISION CAMERA

BACKGROUND OF THE INVENTION

1. Field of the Invention

This invention relates to a color television camera, and more particularly to an optical system adapted to be incorporated in the color television camera in front of image pick-up tubes. The optical system for the color television camera in accordance with this invention is particularly comprised of a zoom lens system and a plurality of prisms for separation of color.

2. Brief Description of the Drawing

FIG. 1 is a side view showing a conventional optical system for a color television camera, FIG. 2 is a side view showing the conventional optical system as shown in FIG. 1 used together with an objective of small relative aperture, FIG. 3 is a schematical side view for explaining the effect obtained by the optical system employed in the color television camera in accordance with the present invention, and FIG. 4 is a side view showing the optical system employed in the color television camera in accordance with the present invention.

DESCRIPTION OF THE PRIOR ART

Referring to FIGS. 1 and 2, a conventional optical system for a color television camera will be described in detail for explaining defects inherent therein. In the conventional optical system for a color television camera as disclosed in U.S. Pat. No. 3,202,039, a color separating prism system comprising a plurality of prism blocks is provided behind the zoom lens system and separated light beams emerging from the prism system are directed to camera tubes.

The color separating prism system shown in FIG. 1 comprises a first prism block 110 having an entrance face 112 extending in perpendicular to the optical axis 100 of the objective (not shown) and an exit face 111 inclined to the optical axis bearing a first dichroic layer 115 which reflects blue light and passes red and green light, a second prism block 120 substantially attached with an air gap therebetween to the exit face 111 of the first prism block 110 having a first exit face 121 inclined to the optical axis 100 bearing a second dichroic layer 125 which reflects red light and passes green light and a second exit face 124 extending in perpendicular to the optical axis of the beam reflected first by the first exit face 121 and then by the entrance face 123 attached to the exit face 111 of the first prism block 110, and a third prism block 130 attached to the first exit face 121 of the second prism block 120 having an exit face 131 extending in perpendicular to the optical axis 100 of the objective. In the above described prism system, an air gap is formed between the dichoroic layer 115 coated on the exit face 111 of the first prism block 110 and the entrance face 123 of the second prism 120 so that the red light reflected by the second dichroic layer 125 may be totally reflected by the entrance face 123 of the second prism block 120. The blue light reflected by the first dichroic layer 115 on the exit face 111 is totally reflected by the entrance face 112 of the same prism block 110 and then emerges therefrom through a second exit face 114 thereof as shown in FIG. 1. Only the green light passes through the first and the second dichroic layers 115 and 125 and emerges from the third prism block 130 through the exit face 131 thereof.

In the above described color separating prism system as shown in FIG. 1, the entrance face 112 of the first prism block 110, the exit face 111 thereof, the entrance face 123 of the second prism block 120 and the exit face 121 thereof are all desired to form angles of less than 30° with a plane which is at right angle to the non-reflecting optical axis 100 of the objective, in order to eliminate undesired polarization phenomena of the light occurring on the inclined dichroic layers.

Further, in order to make the image focus on the photoelectric face of the image pick-up tubes through the color separating prism system, it is necessary to make the distance from the rear end of the objective to the image focusing plane of the tubes, i.e. the back focal length of the objective, substantially long. Paticularly in case of using an objective of small F-number or small relative aperture, the area of the entrance face 112 of the first prism block 110 must be made large and consequently the optical path length on the prism system is required to be long and accordingly the back focal length of the objective is required to be long. However, it is generally difficult to make the back focal length of the lenses of small F-number long. Further, although it is possible to some extent to make the back focal length long in the lenses of small aperture, it is almost impossible to, in addition to this, make the distance between the aperture and the focusing plane long in order to eliminate color shading.

As mentioned hereinabove, the angles formed between the plane perpendicular to the non-reflecting axis 100 and the dichroic layers 115 and 125 coated on the exit face 111 and the exit face 121 are desired to be as small as possible in order to eliminate the undesired polarization phenomena within the range allowed with reference to the critical angle of the total reflection planes 112 and 123. If a lens of small F-number is used with the color separating prism system having small angles between the plane perpendicular to the optical axis 100 and the dichroic layers 115 and 125, however, a part of the light reflected by the dichroic layers is not reflected by the total reflecting faces but passes therethrough out of the prism system. For instance, as shown in FIG. 2, when the first dichroic layer 115 on the exit face 111 is inclined at 25.5° with respect to the plane perpendicular to the non-relecting optical axis and the second dichroic layer 125 on the exit face 121 of the second prism block 120 is inclined at 13° with respect to the same plane and the refraction index of the material forming the prism blocks is 1.52 and if the F-number of the objective used is 1.6, part of the light reflected by the dicroic layers 115 and 125 is not reflected by the reflecting faces 112 and 123 and emerges from the first and the second prism blocks 110 and 120 as indicated by 150 and 151. The emerging of a part of the light from the prism system deteriorates the quality and brightness of the images focused on the focusing plane of the image pick-up tubes.

SUMMARY OF THE INVENTION

In light of the foregoing observations and description of the conventional color separating prism system for a color television camera, the object of the present invention is to provide a color separating optical system which can be used with an objective of small F-number.

Another object of the present invention is to provide a color separating optical system for a color television camera which effectively eliminates the undesired polarization phenomena and color shading in forming color separated images on the image pick-up tubes.

Still another object of the present invention is to provide a color separating optical system for a color television camera which is compact in size.

The color separating optical system in accordance with the present invention is characterized in that the zoom lens system is divided into a front lens component including a zooming lens system and a front part of a relay lens system and three rear lens components including the rear part of the relay lens system, and a color separating prism system is provided between the front lens component and the rear lens components. Further, the rear lens components provided in front of the image pick-up tubes are made to be positive or convergent lens systems so that the angle of the oblique light beam incident into the color separating prism system defining the F-number of the lens may be made smaller than that of the light beam incident into the final focusing plane on the tubes. Based on the above features, it is possible to eliminate or reduce the polarization phenomena and color shading even if the F-number of the objective is small.

DESCRIPTION OF THE PREFERRED EMBODIMENT

Figure 1:
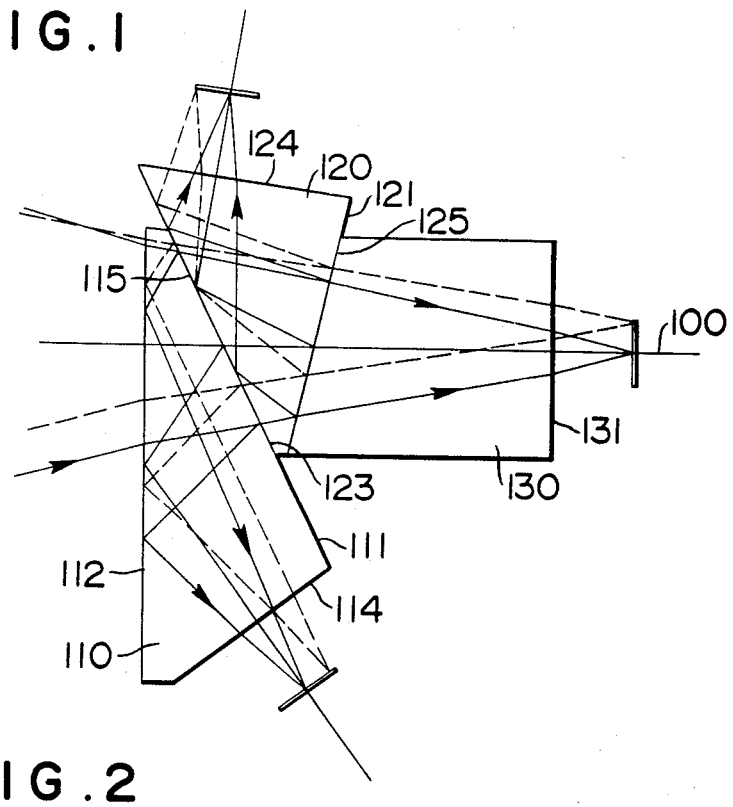
Figure 2:
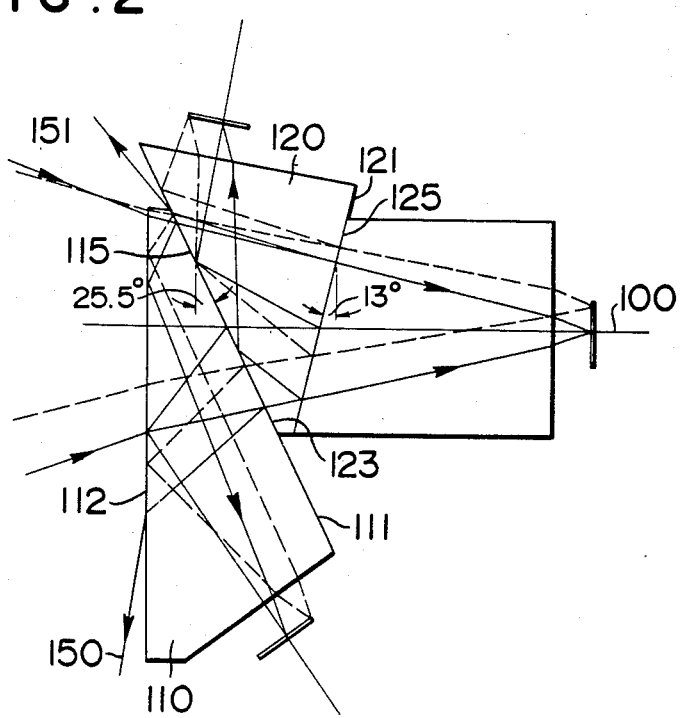
Figure 3:
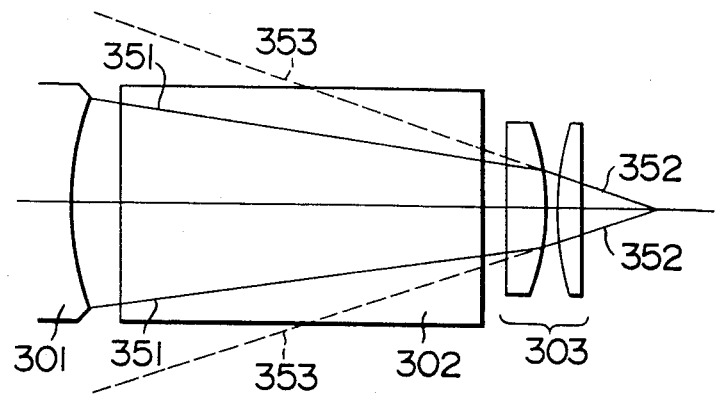

A preferred embodiment of this invention will now be described in detail with reference to FIGS. 3 and 4. FIG. 3 schematically shows the optical system employed in this invention, in which a front lens component 301, a prism system 302 and a rear lens component 303 are arranged in this order. In the conventional optical system in which no lens component corresponding to the rear lens component 303 is employed, the size of the prism must be enlarged when the F-number of the objective or the front lens component is small and the angle of oblique light beams incident to the prism is large. Consequently, the objective is required to have a long back focal length, and color shading and undesired polarization phenomena are likely to occur owing to the large angle of incident light beams as indicated by the numeral 353 in FIG. 3.

On the other hand, in accordance with the present invention in which a positive rear lens component 303 is employed behind the prism 302, the light beams passing through the prism 302 are further converged by the rear lens component 303 and the angle of light beams impinging on the focusing plane of the image pick-up tubes is increased. Therefore, the angle of the light beams 351 incident into the prism 302 can be made smaller than that of the beams 353 supplied when there is no rear positive lens component 303 as shown in FIG. 3.

Figure 4:
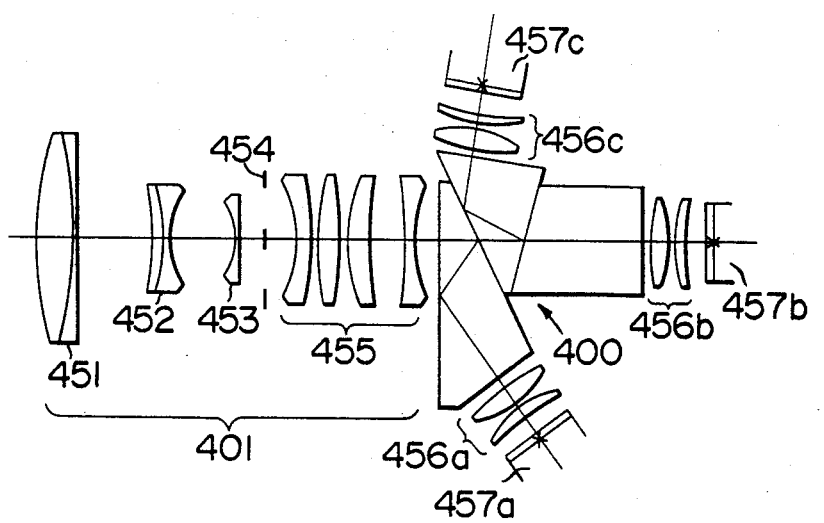

In a preferred embodiment of the present invention as shown in FIG. 4, a color separating prism system 400 is interposed between a front lens component 401 including a zooming lens system 451, 452 and 453 and a front part of a relay lens system 455, and three rear lens components 456a, 456b and 456c serving as the rear part of the relay lens systems located in front of the image pick-up tubes 457a, 457b and 457c, respectively. The front lens component 401 comprises a converging lens system 451, a variable focal length lens system 452, a compensator 453 and a front part of the relay lens system 455. Between the front part of the relay lens system 455 and the compensator 453 is located a stop 454.

The light beam incident into the front lens component 401 passes straight therethrough and enters into the prism system 400 which has the same construction as that of the conventional prism system for separating color as disclosed in FIG. 3 of U.S. Pat. No. 3,202,039. By the prism system 400, the light beam is divided into three colors, blue, red and green. The blue light beam is received by the first tube 457a, the red light beam is received by the second tube 457c and the green light beam is received by the other tube 457b as shown in FIG. 4.

We claim:
1. An optical system for a color television camera comprising a front lens component including a zooming system and a front part of a relay lens system through which the light from the zooming system is converged, a color separating prism system located in the converging light, said prism system having an entrance face and a plurality of exit faces for giving separated light beams of different color located behind said front lens component, and equivalent convergent rear lens components of the same number as said exit faces located behind the exit faces, said convergent rear lens components including the rear part of said relay lens system which has a positive power to further converge the light from the prism system, whereby the angle of marginal light beams defining the F-number of the optical system is made smaller than that of the beams incident into the focusing plane of image pick-up tubes located behind said rear lens components.

2. An optical system for a color television camera as claimed in claim 1 wherein said color separating prism system has an entrance face and three exit faces through which blue, red and green light beams emerge from the prism system.

3. An optical system for a color television camera as claimed in claim 1 wherein said front lens component includes a converging lens system, a variable focal length lens system, a compensator and a front part of a relay lens system, and a stop is interposed between the front part of the relay lens system and the compensator.

* * * * *